Patented Nov. 23, 1937

2,099,695

UNITED STATES PATENT OFFICE 2,099,695

MEANS AND COMPOSITIONS FOR THE STABILIZATION OF DIVINYL ETHER

Randolph T. Major, Plainfield, and William L. Ruigh, Metuchen, N. J., assignors to Merck & Co., Inc., Rahway, N. J., a corporation of New Jersey No Drawing. Original application June 21, 1933, Serial No. 676,926. Divided and this application April 3, 1935, Serial No. 14,438

8 Claims. (Cl. 23—250)

This is a division of our application Serial No. 676,926, filed June 21, 1933.

The present invention relates to means and compositions for stabilizing divinyl ether for various industrial and medicinal uses.

In our copending application, Serial No. 551,098, patented Nov. 19, 1935, No. 2,021,872 we have described the physical and chemical properties of true divinyl ether and processes for producing it in highly pure form which renders it useful for many technical purposes and for anesthesia.

The process for producing this pure divinyl ether, as described in the said copending application, comprises the steps of reacting upon $\beta, \beta'$ dihalogen-diethyl ether with alkali hydroxide in an autoclave under constant stirring to prevent the formation of any crust of alkali upon the surface of the reaction mixture, using appropriate distillation and condensation means, and passing a stream of ammonia gas throughout the reaction, distilling and condensing systems during the conduct of the entire process. The process thus set forth produces as a final product a divinyl ether substantially free from aldehyde, ethylene oxide, 1,4-dioxane, $\beta$-chloroethyl-vinyl ether, etc. In this manner, we were able to produce and isolate for the first time a true divinyl ether showing decidedly different physical constants from the preparations which had theretofore been produced in the belief that they were divinyl ether. Thus, while various products which had hitherto been described as divinyl ethers had shown a wide range of boiling points from, say, 34° to 39° C., the new product resulting from our process described was found to be a volatile, colorless liquid, boiling at about 28.3°±0.3° C. at 760 mm., having a density of $$d_{20}^{20°} \; 0.774 \text{ and } d_{4}^{20°} \; 0.773$$

and a refractive index $$N_D^{20°} \; 1.3989$$

These findings, together with analyses and molecular weight determinations, clearly distinguished our new product from those described in the old literature, and indicated that it is substantially pure C₂H₃.O.C₂H₃.

Based upon the pharmacological studies of Leake and Chan (Proc. Soc. Exper. Biol. and Med., 1930, XXXVIII) of the anesthetic properties of unsaturated ethers, this product, therefore, was indicated on theoretical grounds to be a promising new anesthetic, especially because it was in highly pure form and contained no injurious by-products, such as aldehyde, ethylene oxide, 1,4-dioxane, and $\beta$-chloroethyl-vinyl ether, which are present in the products prepared by the old methods. Recent clinical results have justified the theoretical conceptions as to relatively low toxicity and anesthetically important physical and chemical properties.

So, also, the new product readily lends itself to numerous technical uses—for instance as a solvent for fats, oils and waxes, and for their extraction, and as an intermediate in the preparation of various solid and semi-solid glass-like polymers. On account of its definite composition and properties, it is susceptible to more positive and reliable adaptation to its several possible uses, as compared with the hitherto known preparation of indefinite and varying composition. These advantages are ascribable to the fact that true divinyl ether contains no higher boiling material and no active foreign material, such as acetaldehyde, which reacts with many compounds.

However, it has been found that this new true divinyl ether is prone to decomposition when it is exposed for a time to atmospheric air, with oxidation to peroxides, aldehydes, and acids, and it also readily polymerizes under conditions of such exposure, especially when in a warm place and in the light.

Such decomposition, deterioration and polymerization obviously render the ether unfit, not only for anesthetic uses, but for general technical uses as a solvent and otherwise as well.

It has now been found by us that this new pure unsaturated ether can be effectively protected for practical periods by adding a suitable inhibitor. We have found that groups of substances which satisfactorily inhibit decomposition are various polyphenols, ammonia, and phenolic and non-phenolic aromatic amines. We have found as especially satisfactory, according to the ultimate requirements, such compounds as hydroquinone and pyrogallol, ammonia, antipyrine, quinine, phenyl-a-naphthylamine, phenyl-$\beta$-naphthylamine, o-nitro-aniline, p-phenylene-diamine, p-toluidine, diphenylene-diamine, p-nitrophenylhydrazine, p-aminophenol, N-methylaminophenol, N-isopropylaminophenol, etc.

For anesthetic purposes, such aromatic amines and the like must, of course, also be relatively non-toxic in the quantities employed, and non-volatile. For technical uses of the ether, the chosen inhibitor must be chemically inert for the specific purposes of the use. Such limitations and appropriate selections will be readily understood according to the nature of the materials coming into consideration.

To further protect the ether from decomposition or deterioration, it is also desirable that the vinyl ether be sealed in vacuo or in an atmosphere of an inert gas such as nitrogen.

The practical application of the process for the production of a stabilized divinyl ether comprises the solution of the given appropriate inhibitor in approximately from one part to 100 parts, to as low as one part per 100,000 parts of the ether. Obviously the inhibiting action of these several agents is in general more certain and positive with the relative increase in quantity within reasonable limits, and the specific material selected, as well as the quantities used, may be conveniently modified to adapt the process to the special requirements as indicated.

Thus, in the special case of preparing the divinyl ether for use as a general anesthetic, the inhibiting agent is preferably such a substance as phenyl-a-naphthylamine, because of its relatively low toxicity. This low toxicity again in turn makes it possible to employ relatively larger proportional quantities to insure more positive stabilization. Very satisfactory results have been obtained for this purpose by adding one part of phenyl-a-naphthylamine to 10,000 parts of the ether, although this latter inhibitor exercises a demonstrable inhibitory effect in concentrations as low as 1:10,000.

As a general guide for the quantitative determinations as directed to various practical applications, it has been found that the following inhibitors were generally effective in concentrations of 1:10,000: Hydroquinone, pyrogallol, phenyl-a-naphthylamine, phenyl-β-naphthylamine, o-nitroaniline, antipyrine, p-phenylenediamine, p-toluidine, diphenylenediamine, p-nitrophenylhydrazine, quinine, p-aminophenol, N-methylaminophenol, and N-isopropylaminophenol.

The following inhibitors have been used in concentrations as low as 1:50,000 with appreciable effect: p-phenylenediamine, a-phenylnaphthylamine, hydroquinone, and p-aminophenol.

The further steps of the process comprising the packaging of the material in vacuo or with an atmosphere of nitrogen, for instance, if required, may be practiced by any of the known or convenient methods.

It is desirable, also, especially in the case of divinyl ether, stabilized in the manner indicated when intended for general anesthetic use, to add a quantity of an anti-freeze agent, which, for such uses, should be non-toxic, soluble in the divinyl ether and in water, and volatile in the mixture with the ether. Such an agent is available, for example, in ethyl alcohol, where it has been found that a quantity of about 3.5% by volume is generally sufficient. The quantity of ethyl alcohol for serving as an antifreeze agent with the vinyl ether has been found to range from about 1.5% to about 5%. Excessive quantities of alcohol are to be avoided to prevent the collection of unevaporated alcohol on the ether cone or mask.

We claim as new:

1. Divinyl ether stabilized with a poly-phenol of the group consisting of hydroquinone, pyrogallol, p-N-isopropylamino - phenol, p - aminophenol, and p-N-methylaminophenol.

2. Divinyl ether stabilized with p-N-methylaminophenol.

3. Divinyl ether stabilized with hydroquinone.

4. A stabilized divinyl ether solution containing substantially one part of a polyphenol of the group consisting of hydroquinone, pyrogallol, p-N-isopropylamino-phenol, p-aminophenol, and p-N-methylamino-phenol to from 100 to 100,000 parts of the ether.

5. The process of inhibiting polymerization of divinyl ether which consists of dissolving therein one part of a polyphenol of the group consisting of hydroquinone, pyrogallol, p-N-isopropylaminophenol, p-aminophenol, and p-N-methylaminophenol to from 100 to 100,000 parts of the ether.

6. The process of stabilizing divinyl ether comprising the step of dissolving therein a polyphenol of the group consisting of hydroquinone, pyrogallol, p-N-isopropylamino - phenol, p - aminophenol, and p-N-methylamino-phenol.

7. The method of preserving and packaging divinyl ether which consists of dissolving therein one part of a polyphenol of the group consisting of hydroquinone, pyrogallol, p-N-isopropylaminophenol, p-aminophenol, and p-N-methylaminophenol to from 10,000 to 100,000 parts of the ether and packaging the same in vacuo or with an atmosphere of nitrogen.

8. Divinyl ether stabilized with p-N-isopropylaminophenol.

RANDOLPH T. MAJOR.
WILLIAM L. RUIGH.